No. 732,204. PATENTED JUNE 30, 1903.
A. D. LUNT.
PHASE TRANSFORMATION.
APPLICATION FILED JUNE 25, 1900.
NO MODEL.

Witnesses:
Lewis P. Abell
Benjamin B. Hull

Inventor:
Alexander D. Lunt,
by Albert G. Davis
Atty

No. 732,204. Patented June 30, 1903.

UNITED STATES PATENT OFFICE.

ALEXANDER D. LUNT, OF SCHENECTADY, NEW YORK, ASSIGNOR TO GENERAL ELECTRIC COMPANY, A CORPORATION OF NEW YORK.

PHASE TRANSFORMATION.

SPECIFICATION forming part of Letters Patent No. 732,204, dated June 30, 1903.

Application filed June 25, 1900. Serial No. 21,421. (No model.)

*To all whom it may concern:*

Be it known that I, ALEXANDER D. LUNT, a citizen of the United States, residing at Schenectady, county of Schenectady, State of New York, have invented certain new and useful Improvements in Phase Transformation, of which the following is a specification.

My present invention relates to a method of phase transformation suitable for changing one polyphase system into another. In principle it consists in combining magnetic fluxes having phase relations corresponding to those of the currents of a polyphase system of a given number of phases and inducing by the resultant fluxes electromotive forces having a different number of phases.

The drawings represent my invention diagrammatically and will best be understood in connection with the following description.

The scope of the invention may be determined by reference to the appended claims.

Figure 1:
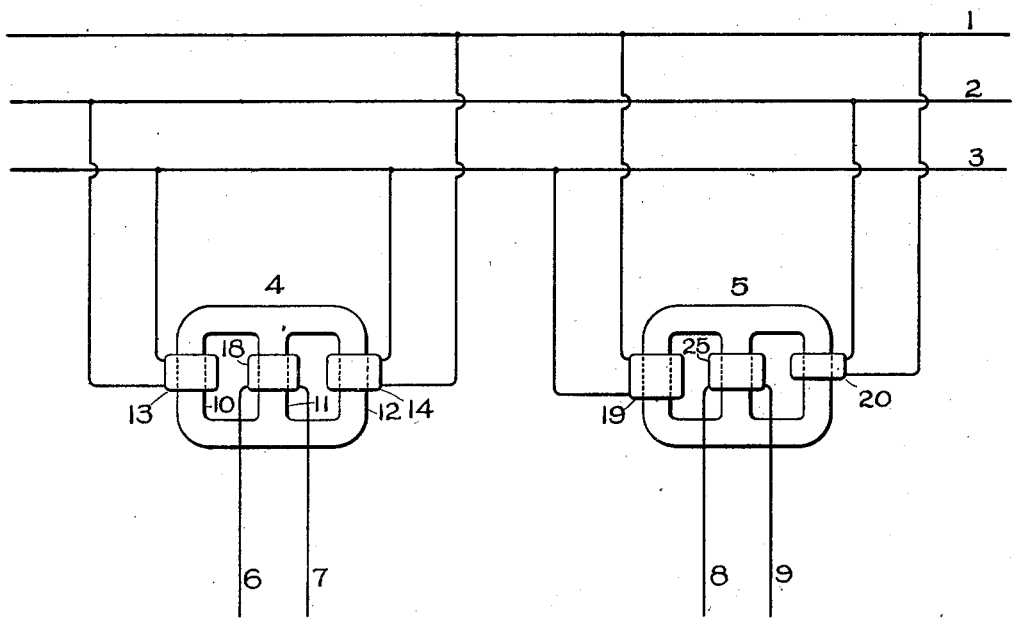
Figure 2:
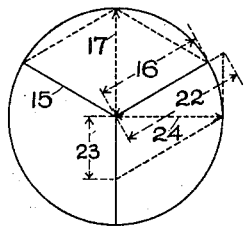

Figure 1 of the drawings is a diagram of a system embodying my invention, and Fig. 2 an explanatory diagram.

In Fig. 1 three-phase mains are shown, 1 2 3. Two transforming devices 4 5 serve as a connecting medium between the three-phase mains 1 2 3 and the quarter-phase 6 to 9, inclusive.

The transforming device 4 consists of a core having three branches 10, 11, and 12. The branch 11 constitutes a common return for the branches 10 and 12. Upon the branches 10 and 12 are mounted coils 13 14, the coil 13 being connected across the mains 2 3 and the coil 14 across the mains 1 3. Each of these coils incloses a flux which, combined with that of the other coil, produces a resultant in the branch of common return 11 of a value equal to each of its components, but displaced in phase midway between them. This relation will be readily understood by an inspection of Fig. 2. In this figure the lines 15 and 16 represent in magnitude and phase the current flowing in the coils 13 and 14, while their resultant 17 represents the current or electromotive force generated in the coil 18, including the common return 11, and connected to the mains 6 7 of the two-phase system.

The transforming device 5 resembles the device 4, except that the connections of the coils and their proportions are somewhat different. As in the first case, the magnetic core of the device is provided with three branches, the two outer branches having mounted thereon the coils 19 and 20, connected, respectively, across the sets of mains 1 3 and 1 2. These coils carry currents having phase relations represented by the lines 22 23 in the diagram in Fig. 2. These coils are proportioned so as to give a resultant flux, (represented by the line 24,) to accomplish which purpose the coil 19 has a slightly larger number of turns and the coil 20 a smaller number of turns than the correspondingly-situated coils in the transforming device 4. The relation of the turns of the coils referred to will readily be understood from the geometrical relations in the explanatory diagram Fig. 2. The current set up in the coil 25, which incloses the fluxes traversing both coils 19 and 20, is equal in value to that in the coil 18, but displaced therefrom by one-quarter of a period, thereby constituting in conjunction therewith a two-phase source of supply from which current is transmitted by means of the mains 6 to 9 already referred to.

It is obvious that the phase transformation described is reversible, so that quarter-phase current may be changed into three-phase, as well as three-phase into quarter-phase. Moreover, my invention is not limited to the particular character of polyphase transformation, since it comprises any transformation in which fluxes are produced having phase relations corresponding to one of the polyphase systems, from which fluxes are produced electromotive forces corresponding to the other polyphase system.

What I claim as new, and desire to secure by Letters Patent of the United States, is—

1. The method of transforming one polyphase system into another which consists in combining magnetic fluxes having phase relations corresponding to the currents to be transformed so as to produce fluxes each the resultant of component fluxes, and inducing electromotive forces by the action of the resulting fluxes.

2. The method of transforming alternating-current systems which consists in generating magnetic fluxes having the same phase relations as the currents of one of said systems, combining said fluxes so as to form resultant fluxes, and generating by the action of the resultant fluxes electromotive forces having the desired phase relations.

3. The method which consists in combining magnetic fluxes having phase relations corresponding to those of the currents of a polyphase system of a given number of phases, thereby producing resultant fluxes, and inducing by the resultant fluxes, electromotive forces having a different number of phases.

In witness whereof I have hereunto set my hand this 23d day of June, 1900.

ALEXANDER D. LUNT.

Witnesses:
BENJAMIN B. HULL,
MABEL H. EMERSON.